Aug. 20, 1957 P. H. THOMAS 2,803,589
METHOD OF AND APPARATUS FOR FLASH EVAPORATION TREATMENT
Filed Dec. 3, 1952 2 Sheets-Sheet 1
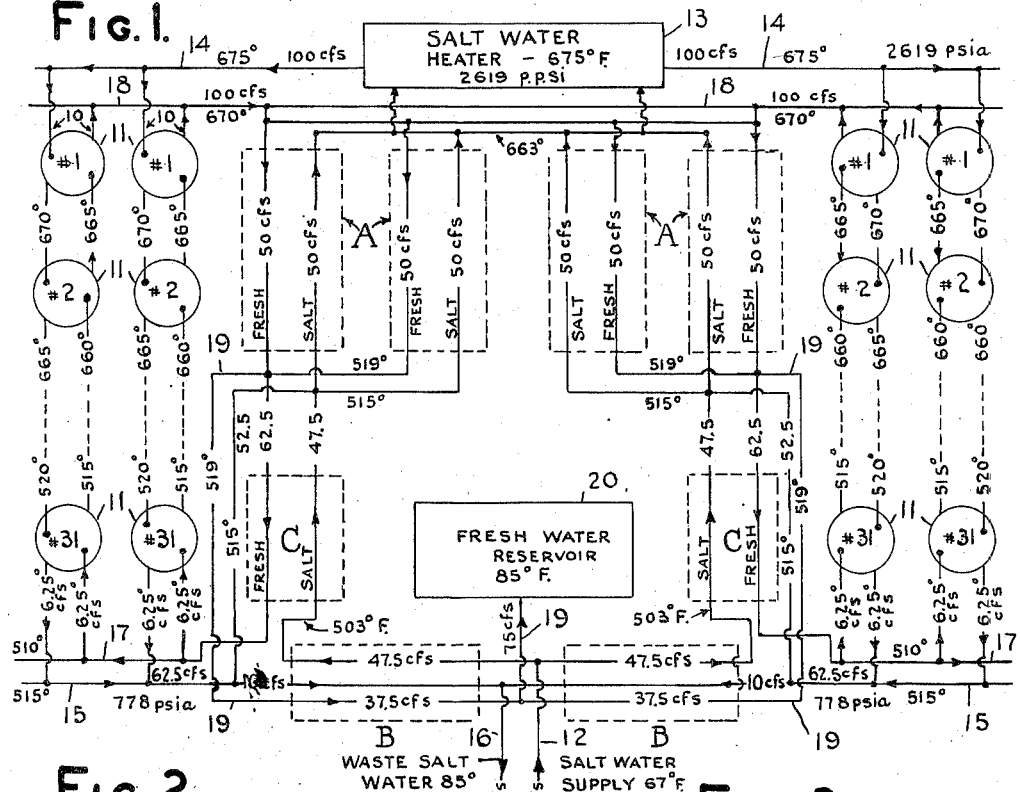
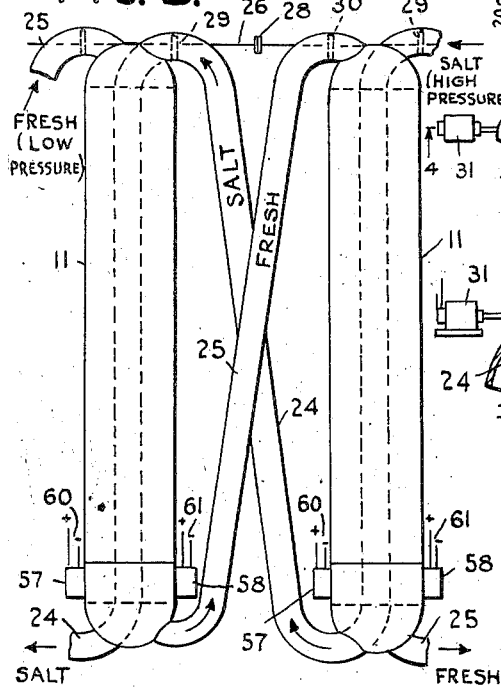
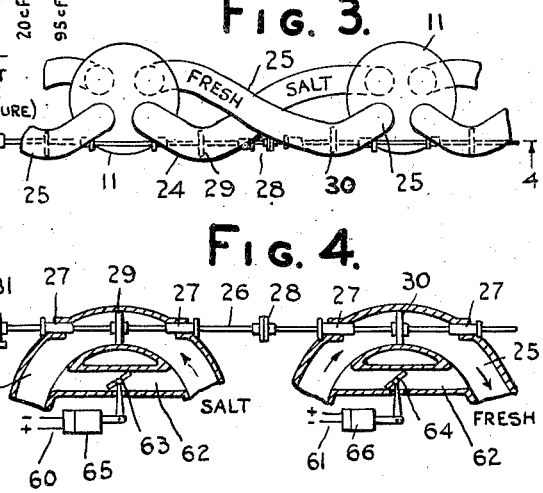
INVENTOR
PERCY H. THOMAS
BY *Curry, Holcombe & Blair*
ATTORNEYS.

Aug. 20, 1957 P. H. THOMAS 2,803,589
METHOD OF AND APPARATUS FOR FLASH EVAPORATION TREATMENT
Filed Dec. 3, 1952 2 Sheets-Sheet 2

INVENTOR
PERCY H. THOMAS

BY Emery, Holcombe & Blair

ATTORNEYS

United States Patent Office 2,803,589
Patented Aug. 20, 1957

2,803,589

METHOD OF AND APPARATUS FOR FLASH EVAPORATION TREATMENT

Percy H. Thomas, Montclair, N. J.; Eleanore T. Allen and Katharine T. Hanson, executrices of said Percy H. Thomas, deceased Application December 3, 1952, Serial No. 323,841

25 Claims. (Cl. 202—53)

This invention pertains to the treatment of salt water and sludge in large volume for concentrating them and for separating from such aqueous mixtures and solutions a smaller volume of fresh water by heating and partially evaporating a continuous stream of the mixture or solution while flowing in vapor phase contact with a cooler stream of fresh water. The invention comprises both the process of treatment and suitable apparatus for carrying it out effectively and at low cost compared with other bulk treatment concentration processes for obtaining fresh water.

According to my invention the salt water or sludge is heated to a high temperature at a pressure which prevents vaporization in a heated pressure vessel, hereinafter called a heater, withdrawn in the liquid phase under pressure, and sprayed through a series of vertical flash evaporators or pressure containers where its pressure and temperature are reduced step by step and the water vapor produced is permitted to escape and condense by commingling with a flowing stream of fresh water maintained at a lower temperature than that of the aqueous solution in the same evaporator and separated therefrom by suitable mechanical means preventing commingling of the liquid portions of the two streams.

Suitable apparatus for practising the invention is illustrated in the accompanying drawings and hereinafter described in connection with a description of what I conceive to be the best mode of carrying out my process and what the invention comprises is defined in the appended claims.

Figure 6:
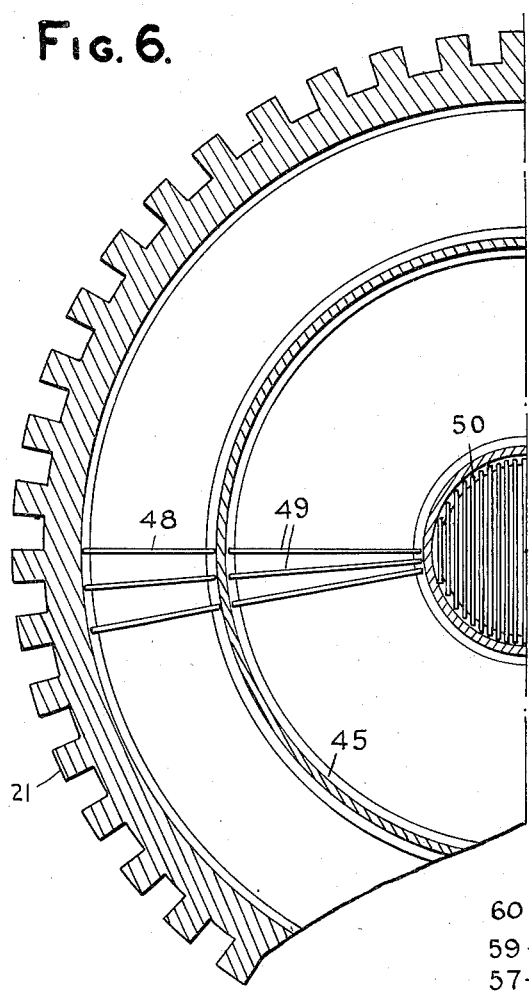
Figure 5:
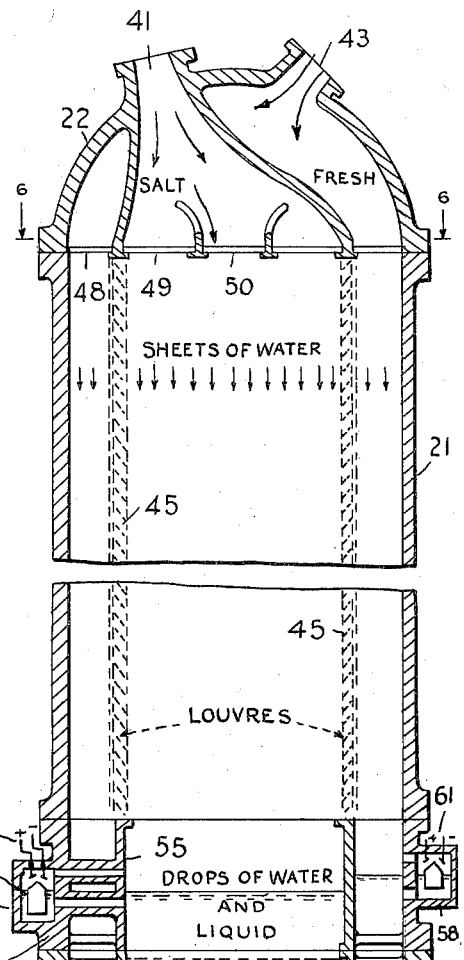
Figure 7:
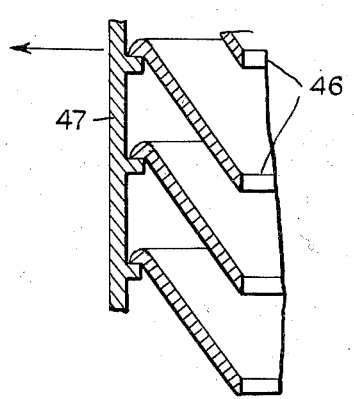

In the drawing, Fig. 1 is a diagrammatic plan or flow sheet of an illustrative example, giving the temperatures, pressures and amounts of fresh and salt water flowing at various points in the apparatus; Fig. 2 is a side elevation and Fig. 3 is a top plan view illustrating the manner of connecting two successive evaporating units; Fig. 4 is a vertical cross-section on the line 4—4 in Fig. 3; Fig. 5 is a vertical cross-section of an evaporating unit drawn to a larger scale and Fig. 6 is a horizontal cross-section thereof on the line 6—6 in Fig. 5, drawn to a still larger scale; and Fig. 7 is a full scale vertical cross-section through the louvres separating the salt water and fresh water compartments in the evaporating units.

The exemplary system, shown in Fig. 1 in part only, for which a thermo-dynamic balance sheet is appended in Table I below, is designed for treating salt water and comprises 620 pressure vessels or vertical containers 11 arranged in two sections of 310 vessels each, disposed in parallel rows with 31 vessels in each row respectively numbered from 1 to 31, inclusive, only four such rows being shown in the drawing and vessels numbered from 3 to 30 being omitted in order to simplify the diagram. Salt water is supplied from a suitable source at about 67° F. through the pipe 12, conducted through suitable heat interchangers B, C and A to a high pressure heater 13 and heated to a temperature of 675° F. at a pressure of not less than 2619 pounds per square inch (absolute), and distributed through a network of pipes 14 and control valves (not shown) to the twenty No. 1 vessels 11 in the system, and thence it flows successively through the thirty-one vessels 11 in each row, wherein a portion is evaporated with loss of from 11.0 to 3.84 B. t. u. in each, and its temperature is reduced to 515° F. with a pressure of 778 pounds per square inch (absolute). The effluent salt water from each of the No. 31 vessels 11 in the twenty rows is collected in a network of pipes 15 and all but a small portion returned to the heater 13 through one or the other of the pair of high temperature heat interchangers A, a suitable high pressure pump (not shown) being provided for this purpose, that portion not so returned being passed through one of the other of a pair of low temperature heat interchangers B to the waste pipe 16. About 10% of the salt water fed is wasted to prevent too great an increase in the salinity of the brine circulating in the system.

The fresh water circulates through the successive vaporizing and condensing vessels 11 in each row in the reverse order to that of the salt water, that is, the fresh water first enters the No. 31 vessel at a pressure of about 778 pounds per square inch (absolute) and leaves through the No. 1 vessel at a pressure of about 2532 pounds per square inch (absolute), being supplied by a network of pipes 17 fed from the network of pipes 18, which network 18 collects the fresh water emerging from the vessels 11 at a temperature of 670° F., due to the heat acquired in condensing the water vaporized in the vessels 11, amounting all told to as much as 37½% of the salt water circulated. The increased volume of fresh water thus produced is partly recirculated to the network of pipes 17 supplying the vaporizing and condensing vessels 11 after passing through the heat interchangers A and C, where it is cooled to a temperature of 510° F. suitable for recirculating through the vessels 11, and a portion is carried away by pipes 19 through the heat interchangers A and B to the fresh water reservoir 20, where it is delivered at a temperature of about 85° F. and stored until drawn off and used for any purpose desired. The entering cold salt water is passed through the low temperature heat interchangers B to abstract heat from the waste salt water and is heated therein to 503° F. and to 515° F. in the intermediate heat exchangers C in the example shown, being further heated to 663° F. in the high temperature heat exchangers A by heat extracted from the fresh water emerging from the twenty rows of vessels 11 at the high pressure end of the evaporation system. The approximate flow in cubic feet per second (C. F. S.) through these high temperature evaporators is shown in the diagram to be 200 C. F. S. of salt water and the same amount of fresh water, of which the greater part is recirculated through the vessels 11.

The vaporizing and condensing vessels 11 under a pressure which never falls below 778 pounds per square inch (absolute), the details of which are shown in Figs. 2 to 7, inclusive, in the exemplary system are about three feet in diameter and twenty-five feet high, the shells 21 and heads 22, 23 being made of steel or other suitable material for withstanding high temperature and high pressure, and bolted or otherwise secured together and supported. The vaporizing and condensing vessels in each row are connected by salt water pipes 24 and fresh water pipes 25 about eleven inches in diameter, leading respectively from the bottom of one column to the top of the next and vice versa, as shown in Fig. 2, the upper bends in both pipes 24 and 25 being in alinement as shown in Figs. 3 and 4 to receive the sections of a power shaft 26 mounted in bearings 27 in the walls of the pipes and connected by flexible couplings 28 to rotate in unison.

Suitable impellers 29, 30, having their vanes or blades oppositely disposed in the bends of the pipes to function one as a turbine and the other as a pump, are mounted on the shaft 26 for promoting circulation of the fresh water through the evaporation system against the increasing pressure in successive containers 11 by the energy of the hotter salt water as it is forced through the successive containers by the pressure maintained in the heater 13, the turbine impeller reducing the pressure of the salt water stream by extracting energy therefrom and the pump impeller increasing the pressure of the fresh water stream by adding thereto the energy extracted from the salt water. A suitable driving motor 31 (shown diagrammatically in Figs. 3 and 4) is also mounted on the shaft 26 for supplying such additional power as may be necessary for maintaining circulation of the water in the pipes 24, 25 and preventing vaporization of the fresh water in the containers 11 as the pressure increases at the high pressure end of the evaporization system.

The pressure vessels 11 may be constructed in any suitable manner to prevent commingling of the streams of fresh and salt water therein while permitting escape of the vapor from the salt water and its condensation and entrainment in the fresh water. In the illustrative apparatus, as shown in Figs. 5, 6, and 7, the salt water enters at the top of each vessel through an inlet passage 41 and escapes at the bottom through an outlet passage 42, while the fresh water also enters at the top through an inlet passage 43 and escapes at the bottom through an outlet passage 44, the two streams being prevented from mixing as they pass through the body of the vessel in separate paths by a cylindrical screen 45 composed of annular louvres 46 supported on circumferentially spaced posts or brackets 47, the louvres slanting downwards and inwards from their outer edges which rest on the supporting brackets.

Both the fresh water and the salt water streams are discharged into the top of the shell 21 through narrow slits formed between bars or fingers 48, 49, 50, which are supported at their ends on shelves or flanges formed at the lower edge of the cap or upper head member 22. These slits are about .02 inch in width and they operate as nozzles to project thin sheets of water at high velocity into the top part of the shell 21, which streams fall freely at increasing speed due to gravity and because of their thinness break up into drops or heavy mist before reaching the bottom of the vessel. The hotter salt water partially vaporizes during this drop and the vapor escapes between the louvres 46 and is condensed upon commingling with the colder fresh water spray in the outer chamber of the vessel.

The level of the fresh water and salt water in the lower parts of the respective containers is kept below a height at which the liquids might commingle by means of an internal wall 55 in a bottom section 56 which is advantageously secured between the lower end of the main body shell 21 and the lower head section 23 and which is provided with float chambers 57, 58 which respectively connect with the passages or chambers for the salt water and fresh water in the vessel, and wherein floats 59 are so disposed as to complete electrical circuits 60 and 61 upon the level of the salt water or fresh water rising beyond that at which there is no danger of either commingling with the other through the spaces between the louvres 46.

Suitable signal devices are connected in the circuits 60, 61 for indicating the condition of the water in the respective containers and automatic control valves operated by these circuits are provided for enabling the flow to be regulated as need be either by cutting down the supply to the entire line of containers or by by-passing a part of the excess water in the containers affected. Pressure and flow control valves, pumps and drain pipes are well known for water systems, but I prefer to regulate the supply to each unit by the level of the liquid being treated therein, by locating by-pass pipes 62 in the upper bends of the salt and fresh water pipes 24 and 25, respectively, and placing suitable balanced valves 63, 64, therein, each of which is controlled individually by a solenoid 65, 66, or other operating device to which the respective circuits 60 and 61 are connected.

Thus in the operation of my process, the salt water passes through the line of pressure vessels 11 from the hottest to the coolest, losing water, pressure and heat all the way, while the fresh water passes through the same line of pressure vessels in the reverse direction from the coolest to the hottest gaining water, pressure and heat all the way. The two streams are kept separate all the way, the salt water on the inside, but with ample opportunity for vapor to pass from one to the other through the louvres. While the amount of water evaporated in any one vessel is small, the aggregate in the line as a whole is substantial, in the case illustrated equal to 37.5% of that entering in one passage; but it is only through having the large number of evaporating and condensing vessels that an effective mode of operation is obtained.

The fresh water, emerging from the hottest pressure vessels at high pressure, contains all the heat given up by condensation of the salt water in passing through the line of vessels. This heat is transferred to the incoming salt water main heater feed through the high level heat interchangers, raising the temperature of this salt water feed within a few degrees of the exit heater temperature, and herein lies the efficiency.

This flash process is most efficient at the higher temperatures where the latent heat is low, and the operating range here utilized covers only the upper 150 degrees of the available temperture range, but with a resulting very low temperature drop per container. With this range the salt water emerging from the lowest container is far hotter than the raw supply, and the fresh water gained by the evaporation is delivered at a temperature correspondingly above the temperature required for actual use. This permits, therefore, the additional low level heat interchangers to be utilized to transfer the excess heat in the fresh water to the cold salt water as it is supplied, thereby conserving heat, and increasing the overall efficiency.

It is found advantageous to recirculate a portion of the salt water emerging from the last container to the heater through the high level interchanger to evaporate a larger portion of it, thereby reducing the amount of fresh salt water required.

A principal advantage of my invention is the saving made in energy needed, represented by the small amounts of heat and power from external sources that are required for operation of the system. The heat supplied is only that necessary for raising the temperature of the salt water leaving the high temperature heaters A from 663° F. to 675° F. in the example given, which is only about 25 B. t. u. per pound treated, far less than is required by any other existing process known to me.

Another advantage is that no piping or storage vessels are required for circulating vapors at any stage of the treatment, the vapors produced in the evaporating containers being condensed therein, which is important also in vacuum concentration of various aqueous solutions and sludges.

Other advantages will occur to those familiar with the operation of bulk water treatment processes, among which one is that no vapor is ever evaporated from a metal surface and hence there is no tendency to form a deposit of salt encrustation as is encountered in most boilers. Also there is a minimum of machine work in fabricating the containers and connections as compared with evaporators of equal capacity, and correspondingly little maintenance expense.

For further details reference is made to the appended Thermodynamic balance sheet (Table I).

From this exemplary table it may be seen that the theoretical input into the system supplied at the main heater is 52.2 B. t. u. per pound of fresh water obtained, equivalent to 438,000 B. t. u. per 1,000 gallons, or 142,000,000 B. t. u. per acre-foot. For practical purposes there should be added to these quantities about 10% for heater losses and 5% for other losses. As the available fresh water produced from one line of containers is 3.75 cubic feet per second, or 75 cubic feet per second from the exemplary system, the fresh water output for 24 hours will be 6,480,000 cubic feet or 48,600,000 gallons, equivalent to 54,300 acre-feet per annum.

Although the invention has been described as applied to the separation of fresh water from brine, it is not restricted thereto, as it obviously is applicable to the treatment in large volume of other materials containing volatile constituents.

3. The method of claim 1 wherein the energy of the heated material stream is utilized to raise the pressure of the fresh water stream to prevent vaporization of the latter as its temperature increases.

4. A system of treating aqueous mixtures and solutions comprising means for heating the starting material under pressure sufficient to prevent vaporization thereof, means for passing said heated material in a finely divided stream through a pressure vessel, means for passing a separate open stream of fresh water at a lower temperature than said material stream through said pressure vessel, means for maintaining the liquids of said streams apart while permitting commingling of vapor from said material stream with said fresh water stream, and means for reducing the pressure on said material stream to permit vaporization of a part thereof with accompanying reduction in its temperature.

TABLE I
*Thermodynamic balance sheet*
STUDY D—MARCH 1952

| Cont. No. | Temp. pool, F. | Cont. press., p. s. i. a. | Lat. heat, B. t. u. | Total heat, B. t. u. | Heat freed, p'd | Heat freed, B. t. u. | Vapor flashed, p'ds | Acc'm'd vapor, p'ds | water left, p'ds | Spec. vol. |
|---|---|---|---|---|---|---|---|---|---|---|
| He'r | 675 | 2618.7 | 332.6 | 745.4 | | | | | | .1196 |
| 1 | 670 | 2531.8 | 353.2 | 734.4 | 11.0 | 11.0 | .03116 | .03116 | .9688 | .1277 |
| 2 | 665 | 2447.4 | 372.4 | 724.1 | 10.3 | 9.98 | .02683 | .05799 | .94201 | .1359 |
| 3 | 660 | 2365.4 | 390.2 | 714.2 | 9.9 | 9.333 | .02392 | .08191 | .91809 | .1442 |
| 4 | 655 | 2285.7 | 406.9 | 704.8 | 9.4 | 8.627 | .02120 | .10311 | .89689 | |
| 5 | 650 | 2208.2 | 422.8 | 695.7 | 9.1 | 8.160 | .01927 | .12238 | .87762 | |
| 6 | 645 | 2132.9 | 437.7 | 687.0 | 8.7 | 7.630 | .01745 | .13983 | .86017 | |
| 7 | 640 | 2059.7 | 452.0 | 678.6 | 8.4 | 7.223 | .01598 | .15581 | .84419 | |
| 8 | 635 | 1988.5 | 465.6 | 670.4 | 8.2 | 6.920 | .01489 | .17068 | .82932 | .1893 |
| 9 | 630 | 1919.3 | 478.8 | 662.3 | 8.1 | 6.720 | .01400 | .18468 | .81532 | |
| 10 | 625 | 1852.0 | 491.4 | 654.4 | 7.9 | 6.440 | .01310 | .19778 | .80222 | |
| 11 | 620 | 1786.6 | 503.6 | 646.7 | 7.7 | 6.179 | .01228 | .21006 | .78994 | |
| 12 | 615 | 1723.0 | 515.3 | 639.1 | 7.6 | 6.000 | .01163 | .22169 | .77831 | .2312 |
| 13 | 610 | 1661.2 | 526.7 | 631.6 | 7.5 | 5.831 | .01108 | .23277 | .76723 | |
| 14 | 605 | 1601.2 | 537.7 | 624.3 | 7.3 | 5.600 | .01043 | .24320 | .75680 | |
| 15 | 600 | 1542.9 | 548.5 | 617.0 | 7.3 | 5.530 | .01006 | .25326 | .74674 | .2558 |
| 16 | 595 | 1486.2 | 558.9 | 609.8 | 7.2 | 5.375 | .00963 | .26289 | .73711 | |
| 17 | 590 | 1431.2 | 569.0 | 602.8 | 7.0 | 5.155 | .00907 | .27196 | .72804 | |
| 18 | 585 | 1377.7 | 578.8 | 595.8 | 7.0 | 5.100 | .00882 | .28078 | .71922 | |
| 19 | 580 | 1325.8 | 588.4 | 588.9 | 6.9 | 4.960 | .00842 | .28920 | .71080 | .3217 |
| 20 | 575 | 1275.4 | 597.7 | 582.1 | 6.8 | 4.830 | .00808 | .29728 | .70272 | |
| 21 | 570 | 1226.5 | 606.7 | 575.4 | 6.7 | 4.715 | .00777 | .30505 | .69495 | |
| 22 | 565 | 1179.1 | 615.5 | 568.8 | 6.6 | 4.577 | .00743 | .31248 | .68752 | |
| 23 | 560 | 1133.1 | 624.2 | 562.2 | 6.6 | 4.519 | .00725 | .31973 | .68027 | |
| 24 | 555 | 1088.5 | 632.6 | 555.7 | 6.5 | 4.418 | .00698 | .32671 | .67329 | |
| 25 | 550 | 1045.2 | 640.8 | 549.3 | 6.4 | 4.311 | .00672 | .33343 | .66657 | .4240 |
| 26 | 545 | 1003.2 | 648.8 | 542.9 | 6.4 | 4.261 | .00657 | .34000 | .66000 | |
| 27 | 540 | 962.5 | 656.6 | 536.6 | 6.3 | 4.160 | .00633 | .34623 | .65367 | |
| 28 | 535 | 923.2 | 664.3 | 530.3 | 6.3 | 4.116 | .00620 | .35253 | .64747 | .4868 |
| 29 | 530 | 885.0 | 671.8 | 524.1 | 6.2 | 4.013 | .00598 | .35851 | .64149 | |
| 30 | 525 | 848.1 | 679.1 | 518.0 | 6)1 | 3.916 | .00577 | .36428 | .63572 | |
| 31 | 520 | 812.4 | 686.4 | 511.9 | 6.1 | 3.873 | .00564 | .36992 | .63008 | |
| 32 | 515 | 777.8 | 693.4 | 505.8 | 6.1 | 3.840 | .00553 | .37545 | .62455 | .5861 |

For each pound of water. Based on Keenan & Keyes steam tables.

I claim the following as my invention:

1. A method of concentrating aqueous mixtures and solutions and/or separating fresh water therefrom in a closed evaporation system which comprises heating the starting material to a temperature substantially above its normal boiling point under pressure sufficient to prevent vaporization, and passing the hot starting material in a stream at reduced pressure in vapor exchange relation to a separate stream of fresh water at a lower temperature while maintaining the latter at a pressure above its point of vaporization, thereby causing vaporization of a portion of said starting material and condensation thereof in said stream of fresh water.

2. The method of claim 1 wherein the pressure of the stream of material under treatment is reduced in successive stages each in vapor exchange relation to the stream of the solvent desired while successively increasing the pressure of the latter to maintain it above the point of vaporization.

5. A system of treating aqueous mixtures and solutions comprising means for heating the starting material under pressure sufficient to prevent vaporization thereof, means for passing said heated material in a finely divided stream through a series of pressure vessels in succession, means for passing a separate open stream of fresh water through said series of pressure vessels successively in the reverse order to and at a lower temperature than said material stream through said series of pressure vessels, means for maintaining the liquids of said streams apart while permitting commingling of vapor from said material stream with said fresh water stream, and means for reducing the pressure on said material stream to permit vaporization of a part thereof with accompanying reduction in its temperature.

6. The system of claim 5 wherein means are provided for increasing the pressure of the fresh water stream in successive pressure vessels to prevent vaporization thereof as its temperature increases.

7. The system of claim 6 wherein the energy of the heated stream of starting material in passing from one pressure vessel to the next at a lower pressure is utilized for raising the pressure of the fresh water entering successive pressure vessels.

8. The system of claim 5 having a heat interchanger wherein heated fresh water emerging from said series of pressure vessels is passed in counter current to starting material emerging from said series of vessels to heat the latter and cool the fresh water.

9. Apparatus for treating aqueous mixtures comprising a series of pressure vessels each having two compartments separated by a wall permeable to vapors, a pressure heater, a heat interchanger, means for circulating the aqueous mixture successively through said heat interchanger, heater and pressure vessels, means at least in part actuated by said aqueous mixture for circulating fresh water through said heat interchanger and pressure vessels successively in reverse order to said aqueous mixture, said aqueous mixture being prevented from commingling with said fresh water by said permeable wall, and means for controlling the pressure drop in successive pressure vesels to permit vaporization of a portion of said aqueous mixture in each with corresponding drop in temperature of said aqueous mixture and increase in temperature of said fresh water therein.

10. Apparatus as set forth in claim 9 having an auxiliary heat exchanger wherein the supply stream of aqueous mixture is caused to pass in counter current relation with the fresh water stream emerging from the series of pressure vessels at highest temperature.

11. Apparatus for concentrating aqueous mixtures and separating fresh water therefrom comprising a series of pressure containers, means for superheating and circulating an aqueous mixture to be treated through said containers in succession under pressure sufficient to prevent complete vaporization thereof, means for circulating fresh water through said series of containers in the reverse order to that of said aqueous mixture, said containers each having separate compartments for said aqueous mixture and said fresh water provided with openings between them permitting passage of vapors from one to the other but preventing commingling of the liquid contents of said compartments, and a heat interchanger arranged for cooling said heated fresh water coming from the high temperature end of said series of containers and heating aqueous mixture coming from the low temperature end of said series of containers in preparation for returning the latter to said superheating and circulating means for further evaporation treatment.

12. In apparatus of the character described in claim 10, automatic means associated with said pressure containers for controlling the amount of flow of aqueous mixture and fresh water through each container individually.

13. In apparatus of the character described in claim 12, floats associated with each compartment and cooperating means for controlling the level of the respective liquids therein to prevent commingling thereof and promote circulation.

14. Apparatus for concentrating aqueous mixtures and solutions and separating fresh water therefrom including a pressure container having its principal axis vertical, a partition extending axially from top to bottom thereof dividing said container into two compartments, inlet and outlet openings at the top and bottom of each such compartment, distributing means at the upper end of each such compartment for discharging entering liquids downwards in finely divided parallel streams, openings through said partition permitting passage of vapor therethrough but preventing passage of liquid from the starting material compartment into the fresh water compartment.

15. Apparatus as set forth in claim 14 wherein said partition comprises closely spaced louvres slanting downwards and towards the side adjacent to the starting material compartment.

16. Apparatus as set forth in claim 15 wherein said distributing means comprises closely spaced bars forming narrow slits between them providing passages for thin films of liquid at increasing velocity under diminishing pressure, whereby the hotter films partially vaporize and the vapors escape through the louvres free from entrained liquid and are condensed in the cooler films of the companion compartments, respectively.

17. Apparatus as set forth in claim 14 wherein the pressure container is in the form of a metal cylinder of at least four times greater height than diameter provided with heads at its top and bottom, and the partition extends throughout substantially the entire length of said cylinder, said heads having two inlet openings at the top and two outlet openings at the bottom one of each of which communicates with each of the compartments for the respective liquids.

18. A method of concentrating aqueous mixtures and separating fresh water therefrom which comprises heating the mixture to a temperature in excess of 600° F. under pressure sufficient to prevent vaporization, passing said heated mixture in a stream in vapor exchange relation to a separate stream of fresh water maintained at a temperature slightly lower than that of said mixture while reducing the pressure on said mixture to permit vaporization of a portion thereof, condensing the vaporized portion of said mixture in said fresh water stream thereby increasing the volume and temperature of said fresh water stream, drawing off a portion of said fresh water stream and cooling the remainder to a temperature below that at which concentrated mixture emerges from said vaporization treatment, and recirculating said cooled remainder in vapor exchange relation to said stream of heated mixture in the direction of increasing pressure thereon.

19. The method set forth in claim 18 wherein the velocity and pressure of the stream of heated mixture is utilized for increasing the pressure of the stream of fresh water passing in counter current relation thereto under automatic control.

20. A plurality of flash evaporators arranged in series comprising pressure containers connected by pipes extending from the bottom of one container to the top of the next adjacent container and from the top of said first container to the bottom of said adjacent container, each container being provided with separate passages for two streams of liquids and having means permitting passage of vapor from one to the other of said liquid streams and blocking passage of liquid from one stream to the other, in combination with means for circulating two liquids at different temperatures above and below the vaporizing point of one of said liquids in separate streams in opposite directions in said pipes through said series of flash evaporators.

21. The combination set forth in claim 20 including means for pre-heating one of said streams and maintaining it at a higher temperature than the other in each container and at a pressure permitting vaporization of a portion thereof and condensation of said vaporized portion in the other stream.

22. The combination set forth in claim 21 including means for pre-cooling the stream of lower temperature and utilizing the heat removed therefrom in preheating the stream of higher temperature;

23. The method of obtaining clear water from contaminated water by passing a body of preheated contaminated water under pressure sufficient to prevent complete vaporization successively through a series of evaporation stages forming a closed system in each of which stages a portion of the said contaminated water is flashed to vapor and condensed in a body of cooler collecting liquid, circulating said cooler collecting liquid through said evaporation stages in countercurrent relation to said contaminated water while preventing commingling of the liquid portions thereof and thereby saving the latent heat of said vapor and returning said latent heat to the incoming contaminated water at the preheating level without descending to a lower temperature, whereby an increase in thermal efficiency is obtained.

24. A flash container including a vertical shell, a vertical vapor permeable but liquid impermeable screen separating the interior of said shell into two parts constituting passages, a top inlet and a bottom exit for each part, a separate sump at the bottom for each part, a bulkhead across both passages inside said inlets and a plurality of narrow slits in said bulkhead, the length of the spaces between the slits being directed toward said screen whereby liquids passing under pressure through said slits are comminuted into thin sheets, with vapor spaced between adjacent sheets leading toward the vapor permeable screen between the two passages.

25. In a system of flash evaporation in which purified solvent is obtained from a solution of a solid in a solvent, the method of operation which consists in simultaneously exposing both a stream of said solution and a stream of the pure solvent in the same confined space, both streams being developed separately in the form of thin sheets and small drops and maintained as individual streams, the stream of solution being at a predetermined higher temperature than the stream of pure solvent, leading to the transfer of vaporized solvent and its concomitant latent heat from the solution to the stream of pure solvent, and later recovering pure solvent from the stream of pure solvent.

References Cited in the file of this patent

UNITED STATES PATENTS

| | | |
|---|---|---|
| 643,702 | Waterhouse | Feb. 20, 1900 |
| 713,297 | Goss | Nov. 11, 1902 |
| 1,204,716 | Thorssell | Nov. 14, 1916 |
| 1,758,595 | Cattaneo | May 13, 1930 |
| 1,799,478 | Peebles | Apr. 7, 1931 |
| 1,881,041 | Benjamin | Oct. 4, 1932 |
| 2,159,303 | Waterman et al. | May 23, 1939 |
| 2,358,559 | Clemens | Sept. 19, 1944 |
| 2,446,880 | Kleinschmidt | Aug. 10, 1948 |
| 2,459,531 | Jones | Jan. 18, 1949 |
| 2,510,548 | Brunjes | June 6, 1950 |
| 2,514,943 | Ferris et al. | July 11, 1950 |

FOREIGN PATENTS

| | | |
|---|---|---|
| 574,885 | Great Britain | Jan. 24, 1946 |